United States Patent
Song (10) Patent No.: US 10,498,639 B2
(45) Date of Patent: Dec. 3, 2019

(54) COLLECTING NETWORK OAM FLOW DATA USING OUT-OF-BAND MESSAGES

(71) Applicant: Futurewei Technologies, Inc., Plano, TX (US)

(72) Inventor: Haoyu Song, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/919,411

(22) Filed: Mar. 13, 2018

(65) Prior Publication Data

US 2019/0288938 A1    Sep. 19, 2019

(51) Int. Cl.

| | | |
|---|---|---|
| *H04L 12/721* | (2013.01) | |
| *H04L 12/851* | (2013.01) | |
| *H04L 12/24* | (2006.01) | |
| *H04L 12/26* | (2006.01) | |

(52) U.S. Cl.
CPC .......... *H04L 45/38* (2013.01); *H04L 47/2483* (2013.01); *H04L 41/00* (2013.01); *H04L 41/0853* (2013.01); *H04L 41/5009* (2013.01); *H04L 43/04* (2013.01); *H04L 43/06* (2013.01); *H04L 43/08* (2013.01);
(Continued)

(58) Field of Classification Search
CPC . H04L 45/38; H04L 47/2483; H04L 43/0852; H04L 43/06; H04L 41/5009; H04L 43/14; H04L 41/0853; H04L 43/04; H04L 43/10; H04L 43/12; H04L 43/08; H04L 41/00
See application file for complete search history.

(56) References Cited

U.S. PATENT DOCUMENTS

| | | | | |
|---|---|---|---|---|
| 9,680,698 | B2 * | 6/2017 | John | H04L 41/0806 |
| 9,680,757 | B2 * | 6/2017 | Eggleston | H04L 41/5009 |
| 9,917,745 | B2 * | 3/2018 | Aldrin | H04L 41/5038 |

(Continued)

FOREIGN PATENT DOCUMENTS

| | | |
|---|---|---|
| CN | 104509032 A | 4/2015 |
| CN | 105430670 A | 3/2016 |
| EP | 2079188 A1 | 7/2009 |

OTHER PUBLICATIONS

Talwar, et al., "Use Cases for gRPC in Network Management," draft-talwar-rtgwg-grpc-use-cases-01, Jan. 17, 2017, 10 pages.
(Continued)

*Primary Examiner* — Brian T O Connor
(74) *Attorney, Agent, or Firm* — Conley Rose, P.C.

(57) ABSTRACT

A method is provided to configure a communication network to perform telemetry of OAM data, implemented in a network management device. A packet flow ID is identified, and a head node and an end node for the packet flow are determined from the flow ID. A marking command is sent to the head node, causing it to mark some packets in the packet flow. An unmarking command is sent to the end node, causing it to unmark marked packets. A path configuration command is received, including a list of nodes through which a marked packet passed. A command is sent to the nodes in the list, configured to cause the nodes to collect specified OAM flow data relating to marked packets. Such data for an individual packet is received after being collected from the nodes in the list. The OAM flow data is used to improve performance of the network.

20 Claims, 6 Drawing Sheets

(52) U.S. Cl.
CPC .......... *H04L 43/0852* (2013.01); *H04L 43/10* (2013.01); *H04L 43/12* (2013.01); *H04L 43/14* (2013.01)

(56) References Cited

U.S. PATENT DOCUMENTS

| | | | | |
|---|---|---|---|---|
| 9,992,056 | B2* | 6/2018 | Ward | H04L 41/0631 |
| 2014/0247719 | A1* | 9/2014 | Bugenhagen | H04L 43/00 370/232 |
| 2015/0263892 | A1 | 9/2015 | John et al. | |
| 2016/0294987 | A1* | 10/2016 | Tian | H04L 69/22 |
| 2017/0111209 | A1 | 4/2017 | Ward et al. | |
| 2018/0278500 | A1* | 9/2018 | Feamster | H04L 43/06 |
| 2019/0068470 | A1* | 2/2019 | Mirsky | H04L 43/0852 |

OTHER PUBLICATIONS

Song, Ed., et al., "Requirements for Interactive Query with Dynamic Network Probes," draft-song-opsawg-dnp4iq-01, Jun. 19, 2017, 18 pages.
Song, Ed., et al., "In-situ OAM Data Type Extension," draft-song-ippm-ioam-data-extension-00, Oct. 17, 2017, 5 pages.
Sambo, et al., "YANG Model for Finite State Machine," draft-sambo-netmod-yang-fsm-01, Jan. 9, 2018, 31 pages.
Quinn, Ed., et al., "Network Service Header (NSH)," draft-ietf-sfc-nsh-17, Jul. 25, 2017, 24 pages.
Clemm, et al., "YANG Datastore Subscription," draft-ietf-netconf-yang-push-13, Feb. 2, 2018, 56 pages.
Zheng, et al., "UDP based Publication Channel for Streaming Telemetry," draft-ietf-netconf-udp-pub-channel-01, Nov. 11, 2017, 12 pages.
Brockners, et al., "Data Fields for In-situ OAM," draft-brockners-inband-oam-data-07, Jul. 2, 2017, 29 pages.
Fioccola, Ed., et al., "Alternate-Marking Method for Passive and Hybrid Performance Monitoring," RFC 8321, 33 pages.
Clemm, et al., "Smart filters for Push Updates—Problem Statement," draft-clemm-netconf-push-smart-filters-ps-00, Oct. 18, 2017, 6 pages.
Bryant, et al., "RFC6374 Synonymous Flow Labels," draft-ietf-mpls-rfc6374-sfl-01, Dec. 5, 2017, 20 pages.
Brockners, et al., "Encapsulations for In-situ OAM Data," draft-brockners-inband-oam-transport-05, Jul. 2, 2017, 30 pages.
Brockners, et al., "Requirements for In-situ OAM," draft-brockners-inband-oam-requirements-03, Mar. 13, 2017, 24 pages.
Handigol, et al., "Where is the Debugger for my Software-Defined Network?," ACM, HotSDN'12, Aug. 13, 2012, Helsinki, Finland, 6 pages.
Claise, Ed., et al., "Specification of the IP Flow Information Export (IPFIX) Protocol for the Exchange of Flow Information," RFC 7011, Sep. 2013, 76 pages.
White, "Definitions of Managed Objects for Remote Ping, Traceroute, and Lookup Operations," RFC 2925, Sep. 2000, 77 pages.
Enns, Ed., et al., "Network Configuration Protocol (NETCONF)," RFC 6241, Jun. 2011, 113 pages.
Brockners, et al., "Data Fields for In-situ OAM," draft-ietf-ippm-ioam-data-00, Sep. 4, 2017, 29 pages.
Machine Translation and Abstract of Chinese Publication No. CN105430670, Mar. 23, 2016, 20 pages.
Foreign Communication From a Counterpart Application, PCT Application No. PCT/CN2019/077612, English Translation of International Search Report dated May 23, 2019, 5 pages.
Foreign Communication From a Counterpart Application, PCT Application No. PCT/CN2019/077612, English Translation of Written Opinion dated May 23, 2019, 5 pages.

\* cited by examiner

COLLECTING NETWORK OAM FLOW DATA USING OUT-OF-BAND MESSAGES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to gain detailed visibility to support effective communication network operations, administration, and management (OAM), it is important to be able to examine a flow packet trace along a forwarding path. Such path-associated data reflects the state and status of each flow packet's real-time experience and provide valuable information for network monitoring, measurement, and diagnosis.

Such data includes the detailed forwarding path, the timestamp/latency at each network node, and other information. Programmable data plane devices currently under development may allow even more sophisticated data to be obtained. All such data can be considered path-associated flow data, and is obtained by observing live user packets. Such data is complementary with other data acquired through indirect passive and active collecting and measuring techniques, such as Internet Protocol (IP) Flow Information Export (IPFIX) and Internet Control Message Protocol (ICMP).

SUMMARY

In an embodiment, the disclosure includes a method for configuring a communication network to perform postcard-based telemetry (PBT) of operations, administration, and management (OAM) data, implemented in a network management device (NMD). The method includes identifying a monitored flow identifier (ID) for a packet flow and determining from the monitored flow ID at least one head node and at least one end node for the packet flow in a communication network; sending a marking command to each determined head node, the marking command comprising the monitored flow ID and configured to cause the head node to mark at least some packets in the packet flow; sending an unmarking command to each determined end node, the unmarking command comprising the monitored flow ID and configured to cause the end node to unmark marked packets in the packet flow; in response to the marking command, receiving a path configuration command comprising a list of PBT-aware nodes in the communication network through which a packet in the packet flow passes; in response to receiving the path configuration command, sending an OAM data set template command to the PBT-aware nodes identified in the list, the OAM data set template command comprising the monitored flow ID and a specification of OAM flow data, the OAM data set template command configured to cause the PBT-aware nodes to collect the specified OAM flow data relating to marked packets in the packet flow; and in response to the OAM data set template command, receiving OAM flow data for an individual packet in the packet flow and using the OAM flow data to improve performance of the communication network, the OAM flow data being collected from the PBT-aware nodes identified in the list.

Optionally, in any of the preceding aspects, another implementation of the aspect provides the monitored flow ID is received in a command from an operator. Optionally, in any of the preceding aspects, another implementation of the aspect provides the marking command comprises a probability function specifying a percentage of packets in the packet flow to mark. Optionally, in any of the preceding aspects, another implementation of the aspect provides the marking command and the unmarking command specify a marking technique. Optionally, in any of the preceding aspects, another implementation of the aspect provides the list of PBT-aware nodes comprises at least one head node, at least one end node, and at least one intermediate node. Optionally, in any of the preceding aspects, another implementation of the aspect provides the marking command and the unmarking command are sent by the NMD using the Network Configuration (NETCONF) protocol. Optionally, in any of the preceding aspects, another implementation of the aspect provides the method further comprising sending the received OAM flow data to an operator.

In an embodiment, the disclosure includes a method for configuring a network to perform PBT of OAM data, implemented in a telemetry data collection device (TDCD). The method includes receiving a message from a node in a network, the message relating to receipt of a marked packet by the node, the message comprising a node identifier (ID) of the node, a packet flow ID of a packet flow, and time data relating to a time of the receipt of the packet by the node; adding the node ID to an ordered list of node IDs relating to the packet flow ID, the list ordered by time from a first node to receive the packet to a last node to receive the packet; and sending a path configuration command to a network management device (NMD) when the list is complete and no previous list of node IDs for the packet flow ID exists, the path configuration command comprising the ordered list of node IDs and configured to cause the NMD to configure the nodes identified in the list to send specified OAM flow data relating to marked packets in the packet flow to the TDCD.

Optionally, in any of the preceding aspects, another implementation of the aspect provides the method further comprising sending the path configuration command to the NMD when the list is complete and is different from a previous list of node IDs for the packet flow ID. Optionally, in any of the preceding aspects, another implementation of the aspect provides the method further comprising adding the specified OAM data to a collection of OAM data for the packet when the message includes the specified OAM data sent in response to the path configuration command; and sending the collection to the NMD when the collection is complete. Optionally, in any of the preceding aspects, another implementation of the aspect provides the message comprises a packet ID. Optionally, in any of the preceding aspects, another implementation of the aspect provides the method further comprising decrypting the message.

In an embodiment, the disclosure includes a network node in a communication network comprising a memory configured to store instructions and a processor coupled to the memory and configured to execute the instructions to receive a packet comprising a packet flow ID; cause a TDCD to collect PBT information relating to the packet by sending a message to the TDCD when the packet is marked for PBT processing, the message comprising a node ID of the network node, the packet flow ID, and time data relating to a time of the receipt of the packet; and include in the message OAM flow data relating to the packet and matching OAM flow data specified in the OAM data set template command when the packet is marked for PBT processing and an OAM data set template command has been received that includes a monitored flow ID that matches the packet flow ID.

Optionally, in any of the preceding aspects, another implementation of the aspect provides the processor is further configured to execute the instructions to cause other nodes in the communication network to perform PBT processing on the packet by marking the packet when a marking command has been received that includes a monitored flow ID that matches the packet flow ID and the packet meets a marking criterion. Optionally, in any of the preceding aspects, another implementation of the aspect provides the marking criterion comprises applying a probability function to the packet. Optionally, in any of the preceding aspects, another implementation of the aspect provides the processor is further configured to execute the instructions to mark the packet according to a PBT marking technique specified in the marking command. Optionally, in any of the preceding aspects, another implementation of the aspect provides the processor is further configured to execute the instructions to unmark the packet when an unmarking command has been received that includes a monitored flow ID that matches the packet flow ID. Optionally, in any of the preceding aspects, another implementation of the aspect provides the processor is further configured to execute the instructions to unmark the packet according to a PBT marking technique specified in the unmarking command. Optionally, in any of the preceding aspects, another implementation of the aspect provides the processor is further configured to execute the instructions to encrypt the message prior to sending.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In-band Network Telemetry (INT) may be used to collect OAM flow data. In some systems, INT may augment a packet header with instructions to tell each network node what data need to be collected. The data is then inserted into the packet by intermediate nodes as a data trace, which is part of the packet. An end node of the path strips off the data trace and sends it to an OAM system for analysis.

The processing steps required to scan an INT header and to collect the specified data may interfere with the normal traffic forwarding (e.g., leading to forwarding performance degradation) and affect the OAM measurement accuracy (e.g., introducing longer forwarding latency and lower throughput). This non-ideal "observer effect" is especially problematic to carrier networks where Network Processing Unit (NPU)-based routers are dominant. The extra work has to be taken into account in the total forwarding cycle budget of the NPU. The required deep packet inspection (DPI) may be infeasible to a data plane fast path where only a limited number of header bytes can be inspected.

INT may increase a user packet's original size by adding the instruction header and data at each traversed node. The longer the forwarding path and the more data is collected, the larger the packet will become. As a result, the size may exceed the path Maximum Transmission Unit (MTU) and cause either packet fragmentation or failure of packet transport. Attempting to prevent such a result by limiting the data size or path length reduces the effectiveness of INT. Where user packets are already sized at the MTU, there is no room in the packets even for the INT instruction header. Similar or additional problems may be encountered in overlay networks and networks using Service Function Chaining (SFC).

INT may require attaching an instruction header to user packets to inform network nodes regarding the types of data that need to be collected. Due to constraints on header overhead, time-length-value encoding (TLV), although capable of representing a large number of data types, has low encoding efficiency and is therefore ill-suited to INT. In an alternative, a bitmap may be used where each bit in the bitmap indicates one pre-defined data type. However, new INT use cases may require new data types. As such, a 16-bit data type bitmap may limit such a system's scalability. Such a bitmap may be extended in some cases to support more data types, but such an extension to an INT header increases a packet's header size. Moreover, bitmap encoding uses bit position as the data type indicator, so even in cases where only one data type is needed, the full bitmap may need to be included.

Additionally, a size of each pre-defined data type is information that must be preconfigured in data plane nodes for correct data handling. Such a system could require a definition of how custom data types are to be supported when a new data type's schema and size are proposed.

An INT header needs to be encapsulated into user packets for transport. However, it is difficult to encapsulate an extra header in Multiprotocol Label Switching (MPLS) and Internet Protocol version 4 (IPv4) networks, which are widely deployed and where path-associated OAM flow data is strongly desired by operators. For example, MPLS requires new top or bottom special labels to indicate the presence of an OAM header. Incremental deployment of such new labels in a network operating under the current MPLS standards would be unsuccessful because, under the current standards an MPLS switch will discard any packets with unknown labels. In addition, an INT requirement to scan the entire label stack is against the normal behavior of MPLS switches. Similar issues arise for IPv4. The proposed Network Virtualization using Generic Routing Encapsulation (NVGRE) for IPv4 actually requires a tunnel to be built between each pair of nodes for such an INT scheme to work.

Such an INT header-based system may be problematic for wide area network deployment and multi-vendor interoperation environment due to security concerns and incremental deployment issues. The INT data may be vulnerable to eavesdropping and tampering as well as Denial of Service attack. Extra protective measurement as a countermeasure may lead to forwarding performance degradation and/or infeasible to a data plane fast path. In some systems, it may be impractical to require a full network upgrade in order to support INT.

Disclosed herein is a method and system for transferring OAM flow data through out-of-band messages sent from some or all nodes that a packet passes through as it flows through a network. Such out-of-band messages may be likened to postcards sent by a traveler to convey information about a journey. Unlike an actual postcard, which is sent by the traveler, 'postcards' in the postcard-based telemetry (PBT) system of the present disclosure are out-of-band packets or other messages that are sent by the nodes that a PBT-marked packet passes through and report specified OAM flow data about the packet.

A user packet, if its path-associated flow data is to be collected, is marked at a path head node (or source node). At each PBT-aware node, a postcard, which is a dedicated OAM packet triggered by the marked user packet, is generated and sent to a PBT collection device. The postcard includes flow path discovery information relating to the packet and may include OAM flow data requested by a network management device in the management plane. The requested OAM flow data is configured (or specified) by the management plane through data set template commands sent to PBT-aware nodes along a discovered flow path, or by other means. Once the PBT collection device receives flow path discovery data from all the postcards for a single user packet, it can infer the packet's forwarding path and report it to the network management device. Once the PBT collector device receives all the postcards for a single user packet containing OAM flow data, it can collate and analyze the flow data and then send the flow data and/or analysis results to the network management device, where it may be used to provision or configure the network for improved performance. A path end node may unmark the packets to its original format, if such unmarking is necessary.

The postcards are referred to as out-of-band packets or messages because they are sent from the PBT-aware nodes to the PBT collection device by a flow path different from the flow path of the marked user packets. The processing to prepare and send postcards is performed in parallel with the handling of marked user packets and without slowing the packets' processing. OAM flow data is sent to the PBT collection device by a path that may have a lower quality of service than the flow path being measured.

Figure 1:
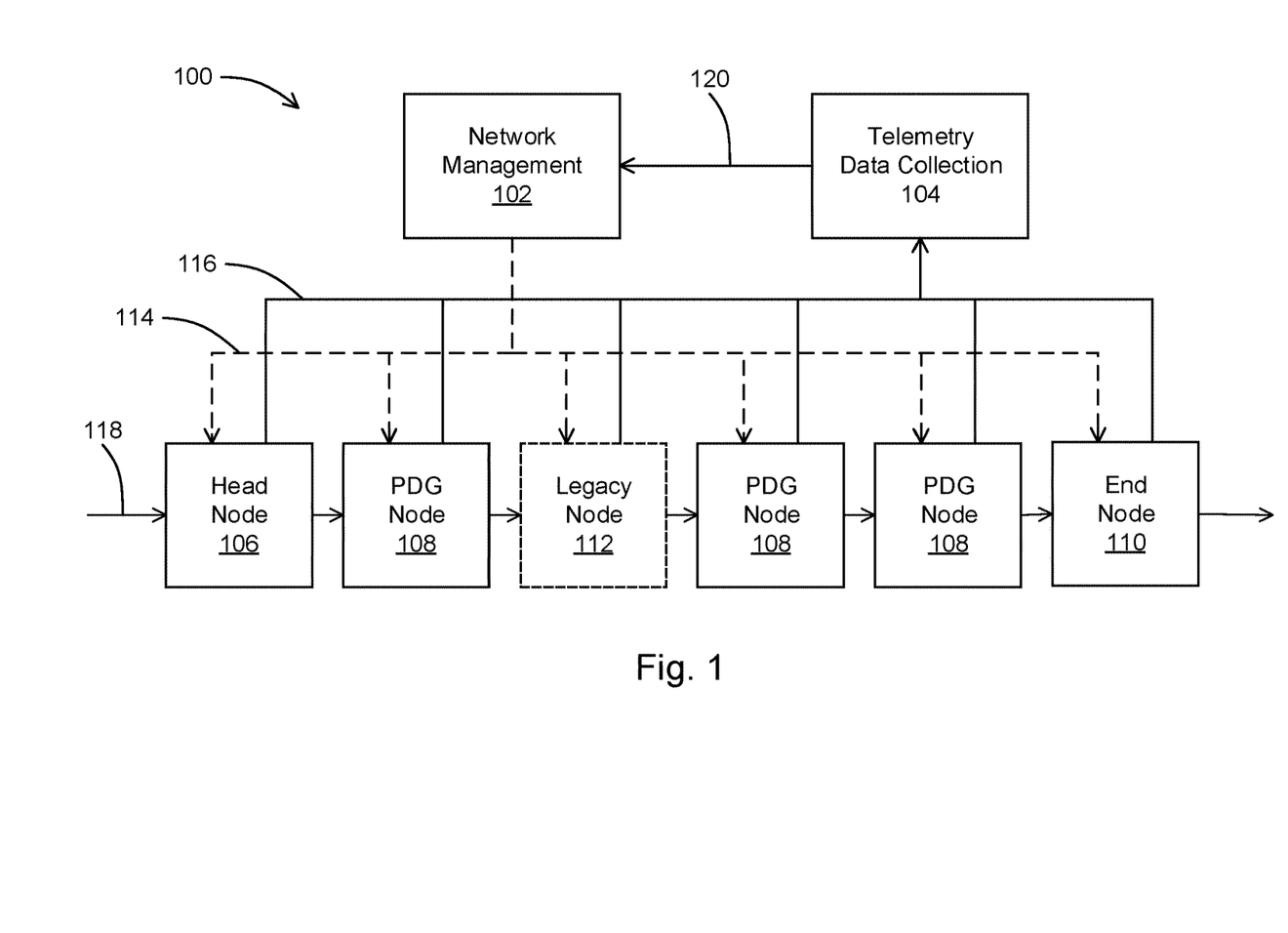
FIG. 1 is a block diagram of a system according to the disclosure.

FIG. 1 is a block diagram of a system 100 according to the disclosure. The system 100 includes a network management device (NMD) 102 and a telemetry data collection device (TDCD) 104. The system 100 further includes communication network nodes that include a head node (or source node) 106, one or more intermediate PBT data generation (PDG) nodes 108, an end node 110, and may include one or more legacy nodes 112. The head node 106, PDG nodes 108, end node 110, and optional legacy nodes 112 may be referred to collectively as "path nodes". The head node 106, PDG nodes 108, and end node 110 may be referred to collectively as "PBT-aware nodes".

In some embodiments, functions of the elements of the system 100 (i.e., the NMD 102, the TDCD 104, and the path nodes 106, 108, 110, and 112) are performed by individual network devices. In other embodiments the functions of more than one element of the system 100 may be performed by a single network device. For example, in some embodiments, a single network device may perform the functions of both the NMD 102 and the TDCD 104. In other embodiments, the head node 106 and the end node 110 also perform the data gathering functions of the PDG nodes 108.

As described in more detail below, the system 100 is configured to collect OAM data about a packet flow 118. The NMD 102 sends commands to the PBT-aware nodes via a packet flow 114. The PBT-aware nodes report PBT information to the TDCD 104 via a packet flow 116. The TDCD 104 sends collected PBT information to the NMD 102 via a packet flow 120. All four packet flows 114, 116, 118, and 120 may exist in a single domain, or may exist in multiple domains.

In the system 100, some packets of the packet flow 118 whose OAM flow data is to be collected are marked by the head node 106. The head node 106 may use a probability function specifying a percentage of packets in the packet flow 118 to mark. Alternatively, the head node 106 may use a time interval between packets to decide whether to mark a packet. In some embodiments, the NMD 102 configures the head node 106 with a rule to use for marking packets. In other embodiments, the head node 106 uses a default rule for marking packets.

In some embodiments, packets are marked using a single bit located in an existing header field. In other embodiments, a label or other packet flag used in an existing protocol is repurposed to mark a packet for PBT processing. In general, the technique for marking PBT packets is chosen to avoid legacy nodes 112 discarding or otherwise mishandling PBT-marked packets. Three non-limiting examples of such PBT marking techniques for packets are presented.

In a first example, Internet Protocol Flow Performance Measurement (IPFPM) is a measurement framework used in IPv4, which also requires a single bit for packet coloring. While IPFPM performs in-network measurement, the system 100 performs only data collection and export at the path nodes, and OAM flow data collation and analysis are performed at the TDCD 104. IPFPM suggests using a reserved bit of the Flag header field or some unused bit of the Terms of Service (TOS) field, which could be repurposed to trigger PBT data collection.

A second example relates to Network Service Header (NSH)-based SFC. The OAM bit in an NSH header can be used to trigger PBT data collection in the path nodes of the system 100. PBT does not require adding any other metadata to the NSH header.

In a third example, instead of choosing a header bit, packets may be marked using the synonymous flow label approach of MPLS. The presence in a packet of a synonymous flow label could indicate that path-associated OAM flow data regarding the packet is to be collected and forwarded using a postcard to the TDCD 104.

PBT-aware nodes are configured to react to PBT-marked packets by sending to the TDCD 104 via the packet flow 116 postcards that include at least basic flow discovery information such as node identifier (ID) and Time-To-Live (TTL). The TDCD 104 collects all such postcards for a packet and alerts the NMD 102 via the packet flow 120 to a flow path for the packet flow 118. In an initial phase of PBT data collection, such flow path discovery information is all that the postcards include.

Once the flow path has been determined, the NMD 102 sends an OAM data set template command to the PBT-aware nodes in the flow path, specifying additional OAM flow data to be collected for PBT-marked packets. The PBT-aware nodes then begin sending to the TDCD 104 postcards that include the specified OAM flow data in addition to the flow path discovery information.

Even while receiving postcards including specified OAM flow data, however, the TDCD 104 continues to monitor the flow path for packets in the packet flow 118. When a change in flow path is detected, the TDCD 104 alerts the NMD 102 to the change in flow path, enabling the NMD 102 to send the OAM data set template to newly-added PBT-aware nodes in the flow path. In some embodiments, OAM data set templates that were previously sent to PBT-aware nodes that are no longer in the flow path automatically time-out. In other embodiments, the NMD 102 explicitly revokes the flow's OAM data set templates in such PBT-aware nodes.

The TDCD 104 correlates the postcards for a single user packet. Once this is done, the TTL (or the timestamp, if the network time is synchronized) may be used to infer the flow forwarding path. Several techniques are available for identifying the affiliation between postcards and packets.

In some embodiments, a packet flow ID and a packet ID are included in the postcard. The packet ID can be some unique information pertaining to a packet (e.g., the sequence number of a TCP packet). In such embodiments, where the packet marking interval is sufficiently long, the packet flow ID itself is enough to identify the packet. That is, all the postcards for the same flow during a short period of time belong to the same packet.

In some embodiments, the packet flow ID is not a separate field in the packet header, but is extracted from a combination of other fields. For example, for an IP packet, the 5-tuple header (Source IP address, Destination IP address, protocol, Source port, destination port) uniquely identify a flow and may serve as a packet flow ID. In other embodiments, however, the packet flow ID may be a separate field in the packet header.

In still other embodiments, where the network is synchronized, the packet flow ID plus the timestamp at each node can also infer the affiliation between postcards and packets. However, some errors may occur under some circumstances in such embodiments. For example, if two close packets from the same flow are both marked and one postcard from a node is lost, then it may be difficult to determine the packet to which the received postcard belongs. In some circumstances, such errors are tolerable.

Thus, the PBT-aware nodes are configured to respond to PBT-marked packets by sending messages to the TDCD 104 that cause the TDCD 104 to collect PBT information such as flow discovery information and OAM data relating to individual packets. The TDCD 104 is configured to respond compiling complete collections of such PBT information for a single packet by sending such complete collections to the NMD 102, where collected OAM data may be used for improving performance of the network. The NMD 102 responds to identifying a packet flow to be monitored by sending messages to PBT-aware nodes to mark packets in the packet flow and to collect and send PBT information relating to PBT-marked packets.

Figure 2:
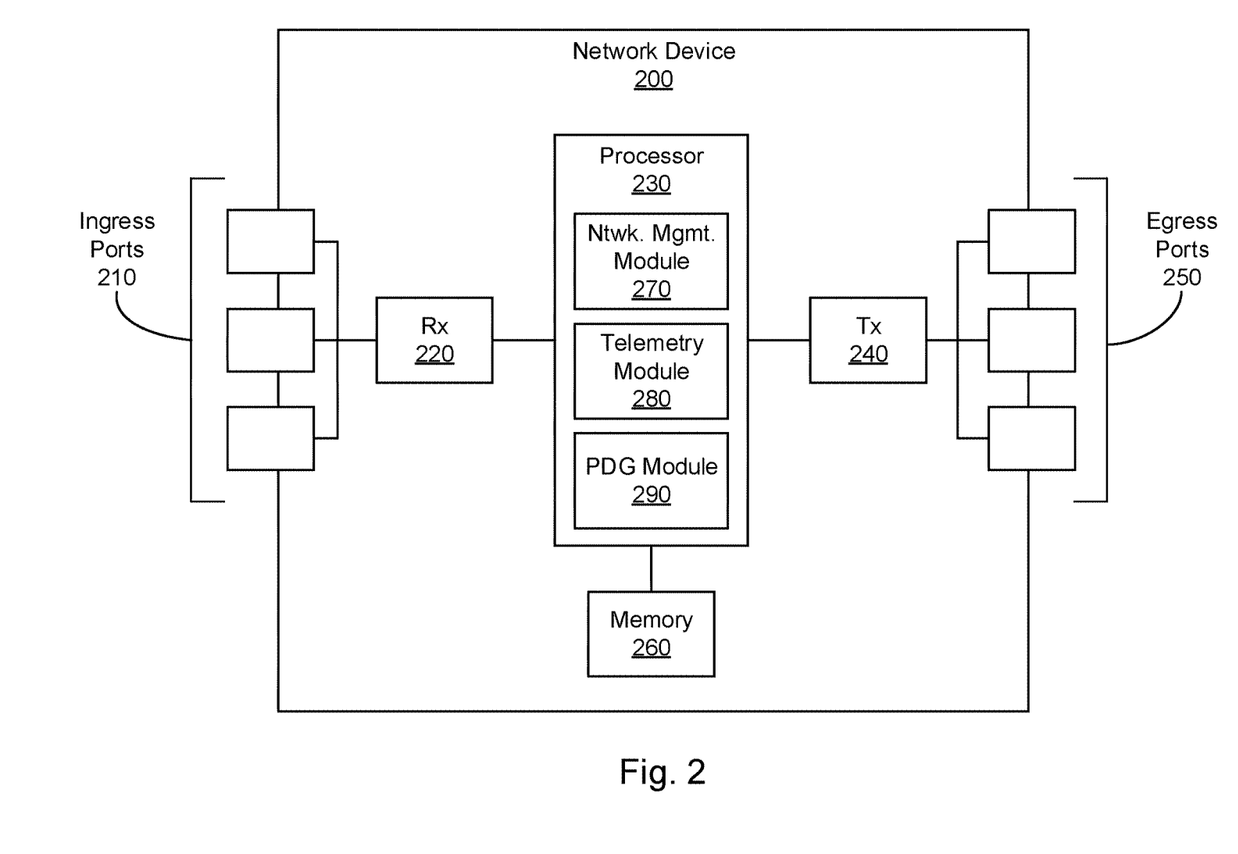
FIG. 2 is a block diagram of a communication network device according to the disclosure.

FIG. 2 is a schematic diagram of a network device 200 (e.g., NMD 102, TDCD 104, or PDG nodes 108) according to an embodiment of the disclosure. The network device 200 is suitable for implementing the disclosed embodiments as described herein. In an embodiment, the network device 200 may be a decoder or an encoder. The network device 200 comprises ingress ports 210 and receiver units (Rx) 220 for receiving data; a processor, logic unit, or central processing unit (CPU) 230 to process the data; transmitter units (Tx) 240 and egress ports 250 for transmitting the data; and a memory 260 for storing the data. The network device 200 may also comprise optical-to-electrical (OE) components and electrical-to-optical (EO) components coupled to the ingress ports 210, the receiver units 220, the transmitter units 240, and/or the egress ports 250 for egress or ingress of optical or electrical signals.

The processor 230 is implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the ingress ports 210, the receiver units 220, the transmitter units 240, the egress ports 250, and the memory 260. The processor 230 comprises one or more of network management module (NMM) 270, telemetry module (TM) 280, and/or PDG module (PDGM) 290. The NMM 270, the TM 280, and the PDGM 290 implement the disclosed embodiments described herein. For instance, the NMM 270 configures the processor 230 to configure network devices to collect OAM flow data, the TM 280 configures the processor 230 to collect and correlate postcard data, and the PDGM 290 configures the processor 230 to prepare and send postcards containing specified OAM flow data. The inclusion of the NMM 270, the TM 280, and/or the PDGM 290 therefore provides a substantial improvement to the functionality of the network device 200 and effects a transformation of the network device 200 to a different state. Alternatively, the NMM 270, TM 280, and/or PDGM 290 are implemented as instructions stored in the memory 260 and executed by the processor 230.

The memory 260 comprises one or more disks, tape drives, and solid-state drives and may be used as an overflow data storage device, to store programs when such programs are selected for execution, and to store instructions and data that are read during program execution. The memory 260 may be volatile and/or non-volatile and may be read-only memory (ROM), random access memory (RAM), ternary content-addressable memory (TCAM), and/or static random-access memory (SRAM).

Figure 3:
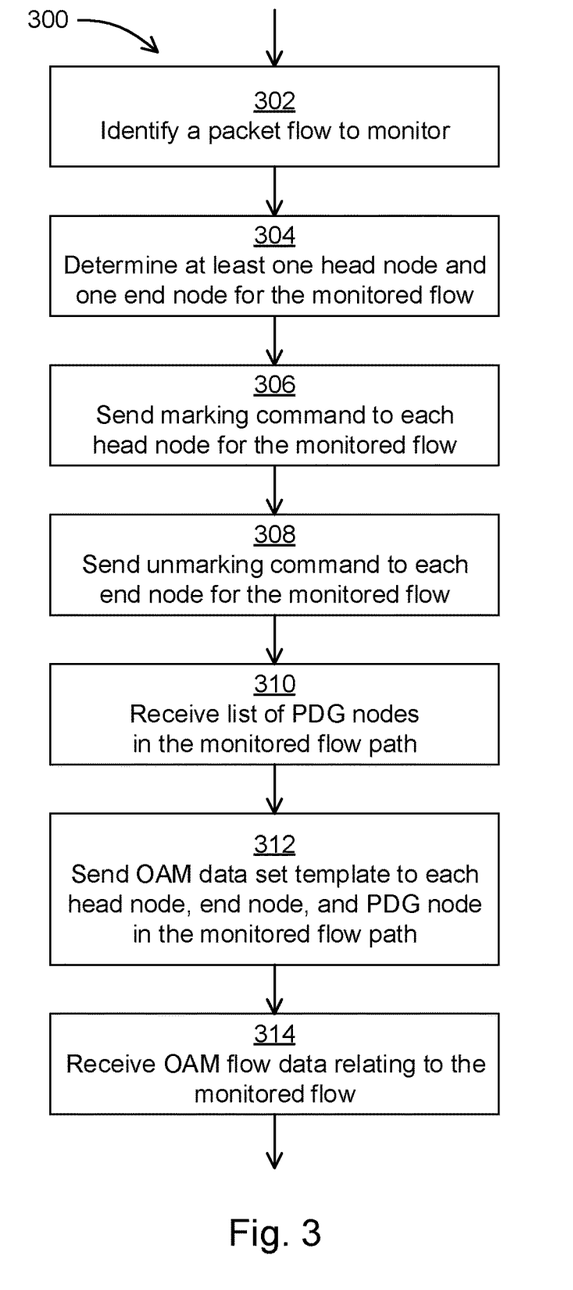
FIG. 3 depicts a method according to the disclosure for configuring a communication network.

FIG. 3 depicts a method 300 according to the disclosure for configuring a communication network. In some embodiments, the method 300 is performed in the NMD 102 by the processor 230. In step 302, the NMD 102 identifies a packet flow (the monitored flow) for which path-associated OAM flow data is to be collected, and a packet flow ID (the monitored flow ID) of the monitored flow. As examples, the monitored flow ID may be specified in a command received from an operator, or the monitored flow ID may be identified in another process or module executing in the NMD 102. In step 304, the NMD 102 determines from network configuration data at least one head node 106 and at least one end node 110 for the monitored flow.

In step 306, the NMD 102 sends a marking command to the head node 106. The marking command is configured to cause the head node 106 to mark at least some packets in the monitored flow. Where a plurality of head nodes 106 are determined in step 304, marking commands will be sent to all head nodes 106. The marking command comprises the monitored flow ID and may include other information needed to configure a flow classifier in the head node 106 to mark some packets in the specified flow for PBT processing by nodes of the communication network. The marking command may also specify a probability or frequency function to apply in deciding whether to mark a packet in the flow.

In step 308, the NMD 102 sends an unmarking command to the end node 110, configured to cause the end node 110 to unmark marked packets in the monitored flow. Where a plurality of end nodes 110 is determined in step 304, marking commands will be sent to all end nodes 110. The unmarking command specifies the monitored flow ID and may include other information needed to configure the end node 110 to remove the PBT-mark from any marked packets in the specified flow.

As described above, packets may be marked using a repurposed label or other packet flag, to prevent legacy nodes along the path from discarding or otherwise mishandling PBT-marked packets. Where more than one PBT marking technique is available for the packet flow, the marking and unmarking commands may specify the technique to be used with the monitored flow. The Network Configuration (NETCONF) protocol may be used to send the marking and unmarking commands.

As will be described in more detail with reference to FIGS. 4 and 5, PBT-aware nodes send postcards relating to at least a first packet marked for the monitored flow to the TDCD 104. The postcards include flow path discovery information, which enables the TDCD 104 to prepare a list of PBT-aware nodes on the path of the monitored flow. In step 310, the NMD 102 receives from the TDCD 104 a path configuration command comprising such a list of PBT-aware nodes. The list may include the head node 106 and the end node 110, as well as the PDG nodes 108. The NMD 102 may also receive a path configuration command from the TDCD 104 if the path of the monitored flow changes while the flow is in use.

In step 312, in response to receiving the path configuration command, the NMD 102 sends an OAM data set template command to the nodes in the received list. The OAM data set template command comprises the monitored flow ID and specifies an identity and data type for one or more pieces of flow data information that are to be gathered relating to packets in the monitored flow. As examples, the OAM data set template may be specified in a command received by the NMD 102 from an operator, or the OAM data set template may be read from memory in the NMD 102.

As will be described in more detail with reference to FIGS. 4 and 5, in response to the OAM data set template command, PBT-aware nodes send postcards relating to packets marked for the monitored flow to the TDCD 104. The postcards include flow path discovery information as well as information specified in the OAM data set template. The TDCD 104 collects and correlates OAM flow data for individual packets. In step 314, the NMD 102 receives this OAM flow data for individual packets from the TDCD 104 and uses the received packet OAM flow data to improve performance of the communication network. In non-limiting examples, the NMD 102 may be used by performing further processing on the received packet OAM flow data (such as applying heuristics to the received OAM flow data), sending the received packet OAM flow data to an operator, or storing the received packet OAM flow data in the NMD 102.

Figure 4:
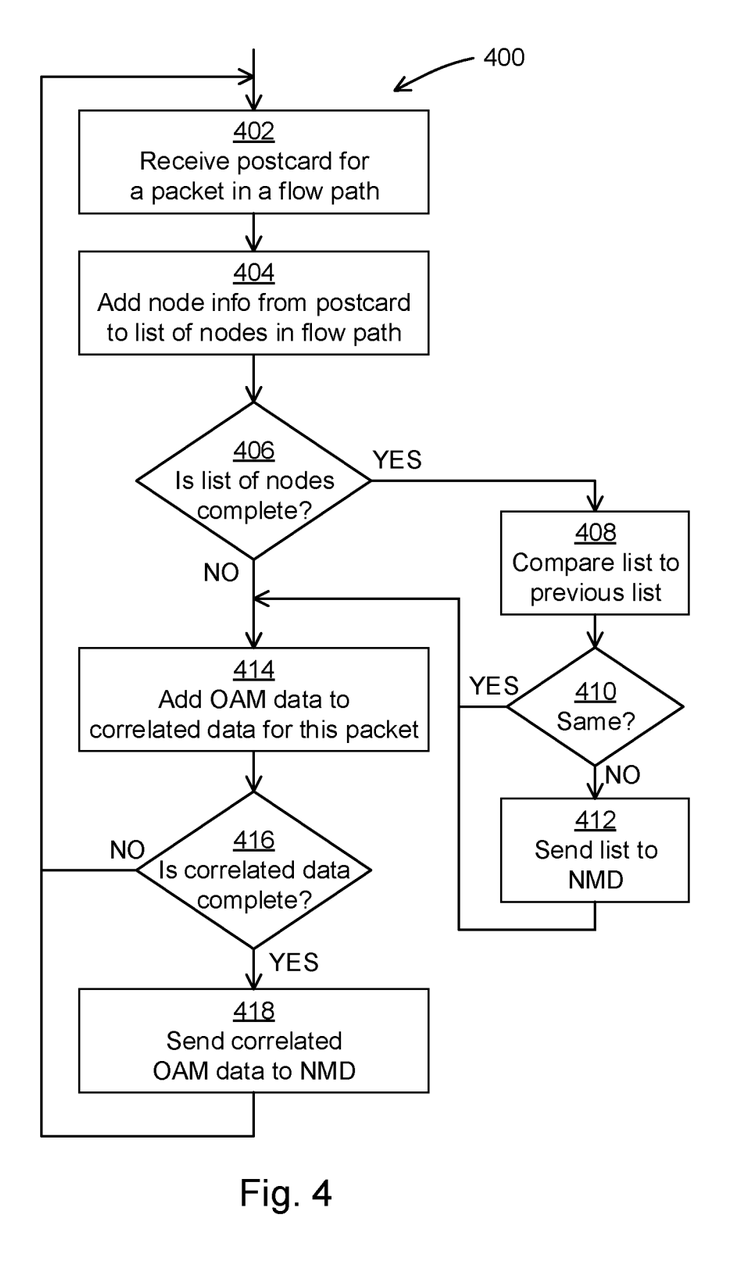
FIG. 4 depicts a method according to the disclosure for collecting OAM flow data.

FIG. 4 depicts a method 400 according to the disclosure for collecting OAM flow data. In some embodiments, the method 400 is performed in the TDCD 104 by the processor 230. In step 402, the TDCD 104 receives via the receiver units 220 a postcard for a packet in a flow path. The packet may be identified to the TDCD 104 by a packet flow ID and/or packet ID, as described above.

In step 404, the TDCD 104 reads from the postcard flow path discovery information, such as a node ID of the node sending the postcard, and adds the flow path discovery information to an ordered list of nodes in the flow path for the packet, where the list is ordered by time, from a first node to receive the packet to a last node to receive the packet. In step 406, the TDCD 104 examines the list to determine whether it is complete. In some embodiments, the TDCD 104 may determine that the list is complete when a specified time period has passed since the last postcard was received for the packet.

If the list is complete, the TDCD 104 compares the completed list to any previous list in step 408. Where the list is being compiled based on postcards received from a first packet in a flow, there will be no previous list for comparison in step 408. In step 410, the TDCD 104 determines whether the completed list is the same as the previous list. If the completed list is not the same as the previous list (or if there is no previous list), the TDCD 104 sends the completed list to the NMD 102 in step 412.

After processing the postcard flow path discovery information in steps 404 through 412, in step 414, the TDCD 104 adds OAM flow data from the postcard to a collection of correlated data for a single packet. The collection of data is correlated at least by packet flow ID. In step 416, the TDCD 104 checks to determine whether the correlated data for the packet is complete. If the correlated data is not complete, the TDCD 104 returns to step 402 to await the receipt of another postcard. If the correlated data is complete, in step 418, the TDCD 104 sends the complete collection of OAM flow data for the packet to the NMD 102.

Figure 5:
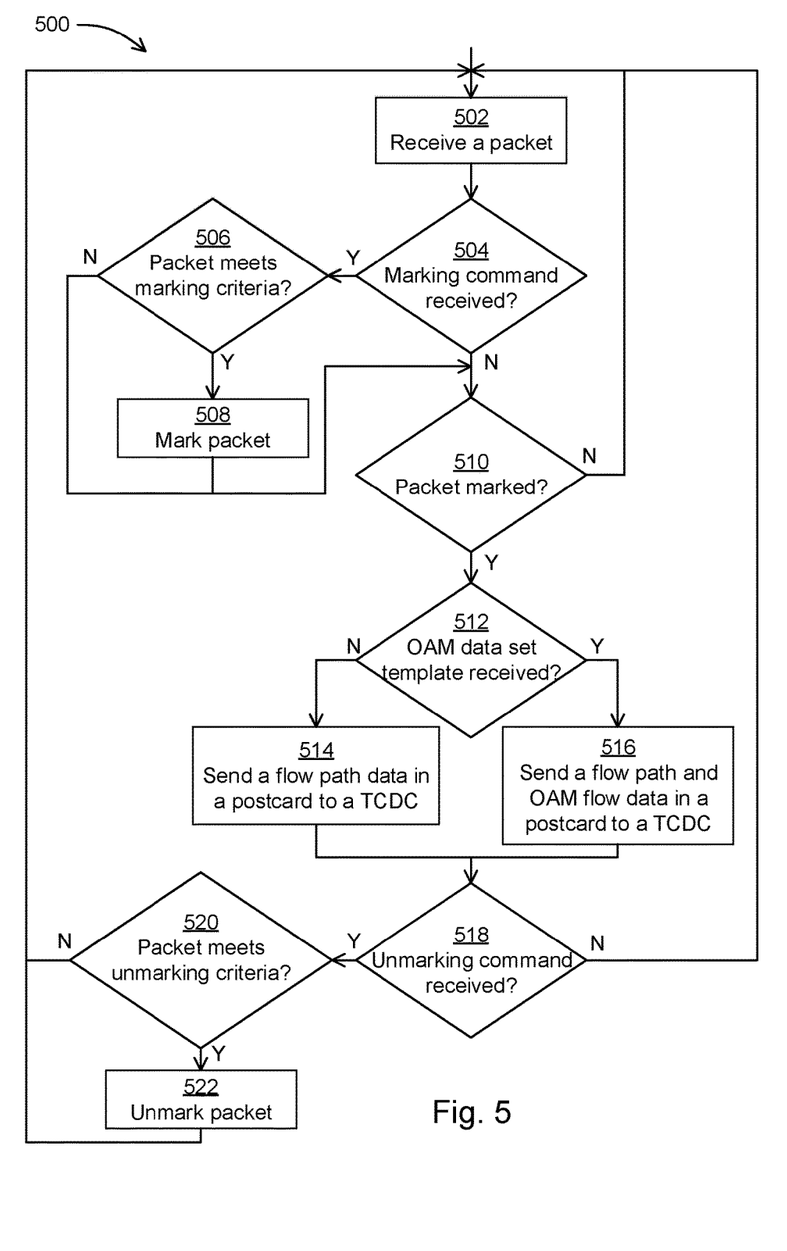
FIG. 5 depicts a method according to the disclosure for generating OAM flow data.

FIG. 5 depicts a method 500 according to the disclosure for generating OAM flow data. In some embodiments, the method 500 is performed by the processor 230 in the PBT-aware nodes (i.e., head node 106, end node 110, and PDG nodes 108). In step 502, the PBT-aware node receives a packet. In step 504, the PBT-aware node determines whether a marking command has been received, indicating that this node was identified by the NMD 102 as a head node for a packet flow. If a marking command has not been received, the PBT-aware node proceeds to step 510.

If a marking command has been received, the PBT-aware node determines in step 506 whether the received packet meets certain marking criteria. If the received packet does not meet the marking criteria, the PBT-aware node proceeds to step 510.

A first marking criterion includes whether a packet flow ID of the received packet matches a monitored flow ID specified in the marking command. A second marking criterion may include application of a probability or frequency function to determine marking only a subset of the packets in the monitored packet flow. Such a probability or frequency function may be specified in the marking command or in another received configuration command or it may be stored in the memory 260 of the PBT-aware node.

If the received packet is determined to meet the marking criteria, it is marked for PBT processing in step 508. The PBT marking technique used in marking the received packet may be specified in the marking command or in another received configuration command or it may be stored in the memory 260 of the PBT-aware node.

After marking the received packet in step 508, the PBT-aware node determines in step 510 whether the received packet is marked. If not, the PBT-aware node returns to step 502 to await the receipt of another packet.

If the received packet is marked, the PBT-aware node determines in step 512 whether an OAM data set template command has been received that includes a monitored flow ID that matches the packet flow ID of the received packet. If not, the PBT-aware node sends flow path discovery information in a postcard to the TDCD 104 in step 514. In step 516, if a matching OAM data set template command has been received, the PBT-aware node sends a postcard to the TDCD 104 that includes flow path discovery information and the OAM flow data specified in the matching OAM data set template command.

The PBT-aware node may send the postcard to the TDCD 104 using any of several suitable protocols. Suitable protocols include Google Remote Procedure Calls (gRPC), Open Daylight's YANG-PUSH, and IPFIX. Where IPFIX is used, new data templates may be defined to support new data types. The postcard may alternatively be sent by encapsulating it into a dedicated OAM packet and sending to the TDCD 104 through UDP. The PBT-aware node may encrypt the postcard to provide security and authentication.

After sending a postcard to the TDCD 104 in either step 514 or step 516, the PBT-aware node determines in step 518 whether an unmarking command has been received, indicating that this node was identified by the NMD 102 as an end node for a packet flow. If an unmarking command has not been received, the PBT-aware node returns to step 502 to await the receipt of another packet.

If an unmarking command has been received, the PBT-aware node determines in step 520 whether the received packet meets certain unmarking criteria. If the received packet does not meet the unmarking criteria, the PBT-aware node returns to step 502 to await the receipt of another packet.

The unmarking criteria include whether the received packet is marked and whether the packet flow ID of the received packet matches the monitored flow ID specified in the unmarking command. The PBT marking technique used in unmarking the received packet may be specified in the unmarking command or in another received configuration command, or it may be stored in the memory 260 of the PBT-aware node. After unmarking the received packet in step 522, the PBT-aware node returns to step 502 to await the receipt of another packet.

Disclosed herein is a method for collecting OAM flow data from a communication network using out-of-band messages referred to as 'postcards' sent by flow path nodes to a telemetry data collection device, under the control of a network management device. The nodes provide initial flow path discovery information and then, on command of the network management device, provide specified additional OAM data about individual packets in the flow. The telemetry data collection device collects the flow path discovery information for a path, as well as the additional OAM data for individual packets and provides the collected information to the network management device, which may use the OAM data to improve performance of the communication network.

Figure 6:
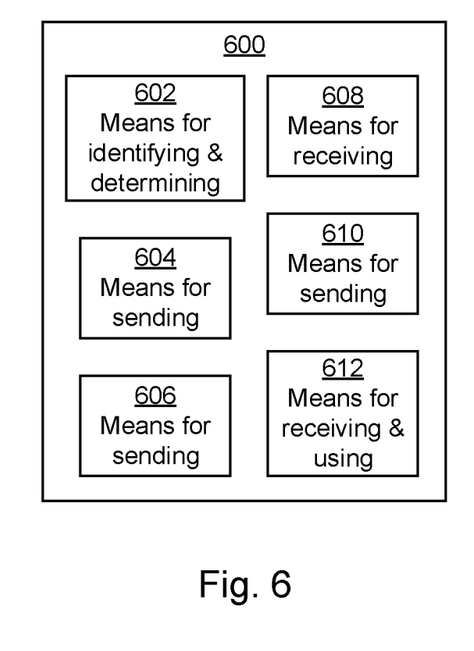
FIG. 6 shows a method according to the disclosure of configuring a communication network to perform PBT of OAM data, implemented in an NMD.

A method according to the disclosure of configuring a communication network to perform PBT of OAM data, implemented in an NMD 600, as shown in FIG. 6. The method includes a means 602 for identifying a monitored flow ID for a packet flow and determining from the monitored flow ID at least one head node and at least one end node for the packet flow in a communication network; a means 604 for sending a marking command to each determined head node, the marking command comprising the monitored flow ID and configured to cause the head node to mark at least some packets in the packet flow; a means 606 for sending an unmarking command to each determined end node, the unmarking command comprising the monitored flow ID and configured to cause the end node to unmark marked packets in the packet flow; a means 608 for receiving, in response to the marking command, a path configuration command comprising a list of PBT-aware nodes in the communication network through which a packet in the packet flow passes; a means 610 for sending, in response to receiving the path configuration command, an OAM data set template command to the PBT-aware nodes identified in the list, the OAM data set template command comprising the monitored flow ID and a specification of OAM flow data, the OAM data set template command configured to cause the PBT-aware nodes to collect the specified OAM flow data relating to marked packets in the packet flow; and a means 612 for receiving, in response to the OAM data set template command, OAM flow data for an individual packet in the packet flow and using the OAM flow data to improve performance of the communication network, the OAM flow data being collected from the PBT-aware nodes identified in the list.

Figure 7:
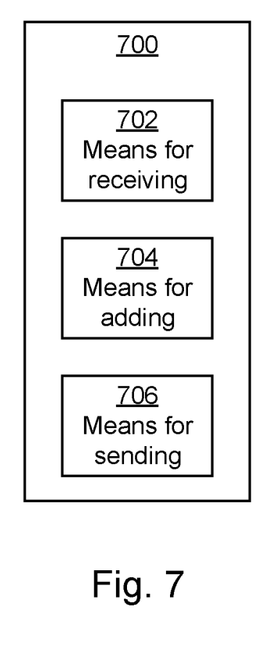
FIG. 7 shows a method according to the disclosure of configuring a communication network to perform PBT of OAM data, implemented in a TDCD.

A method according to the disclosure for configuring a communication network to perform PBT of OAM data, implemented in a TDCD 700, as shown in FIG. 7. The method includes a means 702 for receiving a message from a node in a network, the message relating to receipt of a marked packet by the node, the message comprising a node identifier (ID) of the node, a packet flow ID of a packet flow, and time data relating to a time of the receipt of the packet by the node; a means 704 for adding the node ID to an ordered list of node IDs relating to the packet flow ID, the list ordered by time from a first node to receive the packet to a last node to receive the packet; and a means 706 for sending a path configuration command to a network management device (NMD) when the list is complete and no previous list of node IDs for the packet flow ID exists, the path configuration command comprising the ordered list of node IDs and configured to cause the NMD to configure the nodes identified in the list to send specified OAM flow data relating to marked packets in the packet flow to the TDCD.

Figure 8:
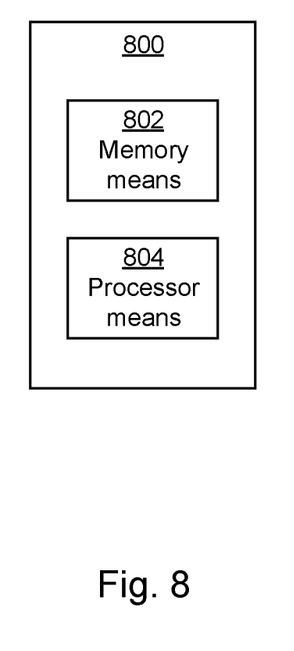
FIG. 8 shows a schematic view of a network node according to the disclosure in a communication network.

A schematic view of a network node 800 according to the disclosure in a communication network, is shown in FIG. 8, comprising a memory means 802 configured to store instructions, and a processor means 804 coupled to the memory means 802 and configured to execute the instructions to cause the processor means 804 to receive a packet comprising a packet flow ID; cause the processor means 804 to cause a TDCD to collect PBT information relating to the packet by sending a message to the TDCD when the packet is marked for PBT processing, the message comprising a node ID of the network node, the packet flow ID, and time data relating to a time of the receipt of the packet; and cause the processor means 804 to include in the message OAM flow data relating to the packet and matching OAM flow data specified in the OAM data set template command when the packet is marked for PBT processing and an OAM data set template command has been received that includes a monitored flow ID that matches the packet flow ID.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly or indirectly coupled or communicating with each other, may be directly or indirectly communicating through some interface, device, or intermediate component whether electrically, mechanically, or otherwise. Where a first element is shown or described as occurring in response to a second element, the first element may occur in direct response or in indirect response to the second element. Other examples of changes, substitutions, and alterations are ascertainable by one skilled in the art and could be made without departing from the spirit and scope disclosed herein.

What is claimed is:

1. A method for configuring a communication network to perform postcard-based telemetry (PBT) of operations, administration, and management (OAM) data, implemented in a network management device (NMD), the method comprising:
    identifying a monitored flow identifier (ID) for a packet flow and determining from the monitored flow ID at least one head node and at least one end node for the packet flow in a communication network;
    sending a marking command to each determined head node, the marking command comprising the monitored flow ID and configured to cause the head node to mark at least some packets in the packet flow;
    sending an unmarking command to each determined end node, the unmarking command comprising the monitored flow ID and configured to cause the end node to unmark marked packets in the packet flow;
    in response to the marking command, receiving a path configuration command comprising a list of PBT-aware nodes in the communication network through which a packet in the packet flow passes;
    in response to receiving the path configuration command, sending an OAM data set template command to the PBT-aware nodes identified in the list, the OAM data set template command comprising the monitored flow ID and a specification of OAM flow data, the OAM data set template command configured to cause the PBT-aware nodes to collect the specified OAM flow data relating to marked packets in the packet flow; and
    in response to the OAM data set template command, receiving OAM flow data for an individual packet in the packet flow and using the OAM flow data to improve performance of the communication network, the OAM flow data being collected from the PBT-aware nodes identified in the list.

2. The method of claim 1, wherein the monitored flow ID is received in a command from an operator.

3. The method of claim 1, wherein the marking command comprises a probability function specifying a percentage of packets in the packet flow to mark.

4. The method of claim 1, wherein the marking command and the unmarking command specify a marking technique.

5. The method of claim 1, wherein the list of PBT-aware nodes comprises at least one head node, at least one end node, and at least one intermediate node.

6. The method of claim 1, wherein the marking command and the unmarking command are sent by the NMD using the Network Configuration (NETCONF) protocol.

7. The method of claim 1, further comprising sending the received OAM flow data to an operator.

8. A method for configuring a network to perform postcard-based telemetry (PBT) of operations, administration, and management (OAM) data, implemented in a telemetry data collection device (TDCD), the method comprising:
    receiving a message from a node in a network, the message relating to receipt of a marked packet by the node, the message comprising a node identifier (ID) of the node, a packet flow ID of a packet flow, and time data relating to a time of the receipt of the packet by the node;
    adding the node ID to an ordered list of node IDs relating to the packet flow ID, the list ordered by time from a first node to receive the packet to a last node to receive the packet; and
    sending a path configuration command to a network management device (NMD) when the list is complete and no previous list of node IDs for the packet flow ID exists, the path configuration command comprising the ordered list of node IDs and configured to cause the NMD to configure the nodes identified in the list to send specified OAM flow data relating to marked packets in the packet flow to the TDCD.

9. The method of claim 8, further comprising:
    sending the path configuration command to the NMD when the list is complete and is different from a previous list of node IDs for the packet flow ID.

10. The method of claim 8, further comprising:
    adding the specified OAM data to a collection of OAM data for the packet when the message includes the specified OAM data sent in response to the path configuration command; and
    sending the collection to the NMD when the collection is complete.

11. The method of claim 10, wherein the message comprises a packet ID.

12. The method of claim 8, wherein the message comprises a packet ID.

13. The method of claim 8, further comprising decrypting the message.

14. A network node in a communication network, comprising:
    a memory configured to store instructions; and
    a processor coupled to the memory and configured to execute the instructions to:
        receive a packet comprising a packet flow identifier (ID);

cause a telemetry data collection device (TDCD) to collect postcard-based telemetry (PBT) information relating to the packet by sending a message to the TDCD when the packet is marked for PBT processing, the message comprising a node ID of the network node, the packet flow ID, and time data relating to a time of the receipt of the packet; and include in the message OAM flow data relating to the packet and matching OAM flow data specified in the OAM data set template command when the packet is marked for PBT processing and an OAM data set template command has been received that includes a monitored flow ID that matches the packet flow ID.

15. The network node of claim 14, wherein the processor is further configured to execute the instructions to cause other nodes in the communication network to perform PBT processing on the packet by marking the packet when a marking command has been received that includes a monitored flow ID that matches the packet flow ID and the packet meets a marking criterion.

16. The network node of claim 15, wherein the marking criterion comprises applying a probability function to the packet.

17. The network node of claim 15, wherein the processor is further configured to execute the instructions to mark the packet according to a PBT marking technique specified in the marking command.

18. The network node of claim 14, wherein the processor is further configured to execute the instructions to unmark the packet when an unmarking command has been received that includes a monitored flow ID that matches the packet flow ID.

19. The network node of claim 18, wherein the processor is further configured to execute the instructions to unmark the packet according to a PBT marking technique specified in the unmarking command.

20. The network node of claim 15, wherein the processor is further configured to execute the instructions to encrypt the message prior to sending.

* * * * *